(12) United States Patent
Huang et al.

(10) Patent No.: US 8,119,853 B2
(45) Date of Patent: Feb. 21, 2012

(54) LOW PRESSURE ACETYLENE STORAGE

(75) Inventors: Shih-Wen Huang, Paris (FR); Jun Sonobe, Tsukuba (JP)

(73) Assignee: L'Air Liquide Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 186 days.

(21) Appl. No.: 12/352,432

(22) Filed: Jan. 12, 2009

(65) Prior Publication Data

US 2009/0182180 A1    Jul. 16, 2009

Related U.S. Application Data

(60) Provisional application No. 61/020,344, filed on Jan. 10, 2008.

(51) Int. Cl.
*B65B 1/04* (2006.01)
(52) U.S. Cl. .............................. 585/899; 141/3; 141/20
(58) Field of Classification Search .......................... None
See application file for complete search history.

(56) References Cited

U.S. PATENT DOCUMENTS

| 5,704,965 A | 1/1998 | Tom et al. |
| 6,592,653 B2 | 7/2003 | Wang et al. |
| 6,660,063 B2 | 12/2003 | Tom et al. |
| 6,939,394 B2 | 9/2005 | Carruthers |

FOREIGN PATENT DOCUMENTS

EP    0 874 882    10/2002

OTHER PUBLICATIONS

Detz, C.M., "Threshold conditions for the ignition of acetylene gas by a heated wire," Combustion and Flame 26 (1976) 45.
Matsuda, R., "Highly controlled acetylene accommodation in a metal-organic microporous material," Nature 436 (2005) 238.
Sannsonenko, D.G., "Microporous magnesium and manganese formats for acetylene storage and separation," Chem. Asian J. 2 (2007) 484.

*Primary Examiner* — Tam M Nguyen
(74) *Attorney, Agent, or Firm* — Patricia E. McQueeney

(57) ABSTRACT

Methods and apparatus for the storage of acetylene include providing an acetylene storage device which has an interior volume. A carbonaceous adsorbent is disposed in the interior volume of the storage device, and acetylene is introduced into the storage device to be reversibly adsorbed by the carbonaceous adsorbent. A pressure of less than 2 bar is maintained in the storage device.

16 Claims, 5 Drawing Sheets

LOW PRESSURE ACETYLENE STORAGE

CROSS-REFERENCE TO RELATED APPLICATIONS

The present application claims the benefit of U.S. Provisional Application Ser. No. 61/020,344, filed Jan. 10, 2008, herein incorporated by reference in its entirety for all purposes.

BACKGROUND

1. Field of the Invention

This invention relates generally to the fields of semiconductor, photovoltaic flat panel, or LCD-TFT device fabrication.

2. Background of the Invention

Acetylene is a hydrocarbon useful in many industrial applications, including in the manufacture of semiconductor devices. Typically acetylene is dissolved in a solvent and stored in conventional cylinders which are filled with a porous media. This is done to prevent the explosive decomposition of acetylene. Because acetylene is thermodynamically unstable as compared to is constituent elements (carbon and hydrogen) decomposition, once initiated, can lead to an explosion. Dissolving acetylene in acetone and using porous storage media greatly reduces this hazard, primarily by providing thermal mass and reducing the free volume in the cylinder.

When acetylene stored this way is withdrawn from a cylinder, a small amount of solvent may be entrained in the withdrawn acetylene. The amount of entrained solvent is dependent upon factors such as the cylinder pressure, temperature and the rate at which the acetylene is withdrawn from the cylinder. The amount of entrained solvent may also change as the total amount of acetylene stored in the cylinder decreases. It is possible that the amount of solvent in the acetylene can range from about 0.1% to about 1% or even depending on the flow rate of withdraw, up to about 10%.

The presence of solvent in acetylene may be quite detrimental to some processes used in the chemical and semiconductor industries (including processes used for producing logic components, memory components, flat panel components and photovoltaic components) which require a high purity acetylene supply. Many of these processes occur at very high temperatures, and at these temperatures solvents will often result in the formation of oxygen, which can be highly undesirable from a process standpoint.

Methods exist for supplying acetylene without solvent to industrial applications. For instance, acetylene packaged without solvent is available, but it is only stored in gaseous state (at pressures below about 35 psig), making the amount of volume capable to be provided very low. Likewise, it is possible to produce acetylene on site in order to avoid storing the acetylene in a solvent. However, producing acetylene on site through hydrocarbon cracking is a capital intensive operation and only usually practical for very high consumption rates. Another method of on site production of acetylene is through the hydrolysis of calcium carbide, however, this method results in acetylene that may be contaminated with water vapor and with any contaminants present in the water used for the hydrolysis.

In the semiconductor industry, amorphous carbon film deposition in plasma enhanced chemical vapor deposition ("PECVD") reactors is becoming a widely accepted process for increasing the resolution from lithography processes ("hard mask process"). As a result, unsaturated hydrocarbons such as propylene and acetylene are starting to be used more in the electronics industry. In order to meet the high purity and process control requirements of the semiconductor industry, a means of delivery large volumes of high purity, solvent free acetylene is required. Solvent and porous media free acetylene cylinders are not practical for supplying the electronics industry for hardmasks as the storage capacity of the cylinders is too small. The number of cylinder changes for a given tool in high volume production would be excessive.

Consequently, there exists a need for improved methods and apparatus for to store and supply acetylene.

BRIEF SUMMARY

The invention provides novel method for the storage of acetylene. In an embodiment, a method for storing acetylene comprises providing an acetylene storage device which has an interior volume. A carbonaceous adsorbent is disposed in the interior volume of the storage device, and acetylene is introduced into the interior volume. At least part of the acetylene introduced into the storage device is reversibly adsorbed with the carbonaceous adsorbent, and the pressure in the storage vessel is maintained at a pressure less than about 2 bar.

In an embodiment, an acetylene storage device comprises a pressure vessel with an inlet/outlet and an interior volume. A pressure reducing means is in fluid communication with the inlet/outlet, and a carbonaceous adsorbent is disposed in the interior volume of the pressure vessel. The adsorbent has an average diameter of beads less than about 0.7 mm, a bulk density of about 0.6 g/cm$^3$, and a specific surface area between about 1,100 and about 1,300 m$^2$/g.

Acetylene is at least partially reversibly adsorbed by the adsorbent.

Other embodiments of the current invention may include, without limitation, one or more of the following features:
- the pressure maintained in the storage device is less than atmospheric pressure;
- at least part of the adsorbed acetylene is desorbed and withdrawn from the storage device;
- the desorbed acetylene is withdrawn from the storage device at a rate of less than about 5 standard liters per minute (slm);
- the desorbed acetylene is withdrawn from the storage device at a pressure less than about 2 bar;
- the storage device and the carbonaceous adsorbent is pre-treated prior to the introduction of the acetylene;
- the pre-treating comprises heating to a temperature of about 200° C.;
- the carbonaceous adsorbent comprises carbon beads;
- the carbonaceous adsorbent has an average diameter of beads less than about 0.7 mm, a bulk density of about 0.6 g/cm$^3$, and a specific surface area between about 1,100 and about 1,300 m$^2$/g; and
- the pressure reducing means limits the pressure of acetylene, which enters or leaves the pressure vessel/storage device, to a pressure less than about 2 bar.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Generally, the invention provides novel method for the storage of acetylene. In an embodiment, a method for storing acetylene comprises providing an acetylene storage device which has an interior volume. A carbonaceous adsorbent is disposed in the interior volume of the storage device, and acetylene is introduced into the interior volume. At least part of the acetylene introduced into the storage device is reversibly adsorbed with the carbonaceous adsorbent, and the pressure in the storage vessel is maintained at a pressure less than about 2 bar. The current invention also relates to an acetylene storage device which comprises a pressure vessel with an inlet/outlet and an interior volume. A pressure reducing means is in fluid communication with the inlet/outlet, and a carbonaceous adsorbent is disposed in the interior volume of the pressure vessel. The adsorbent has an average diameter of beads less than about 0.7 mm, a bulk density of about 0.6 g/cm$^3$, and a specific surface area between about 1,100 and about 1,300 m$^2$/g. Acetylene is at least partially reversibly adsorbed by the adsorbent.

Figure 1:
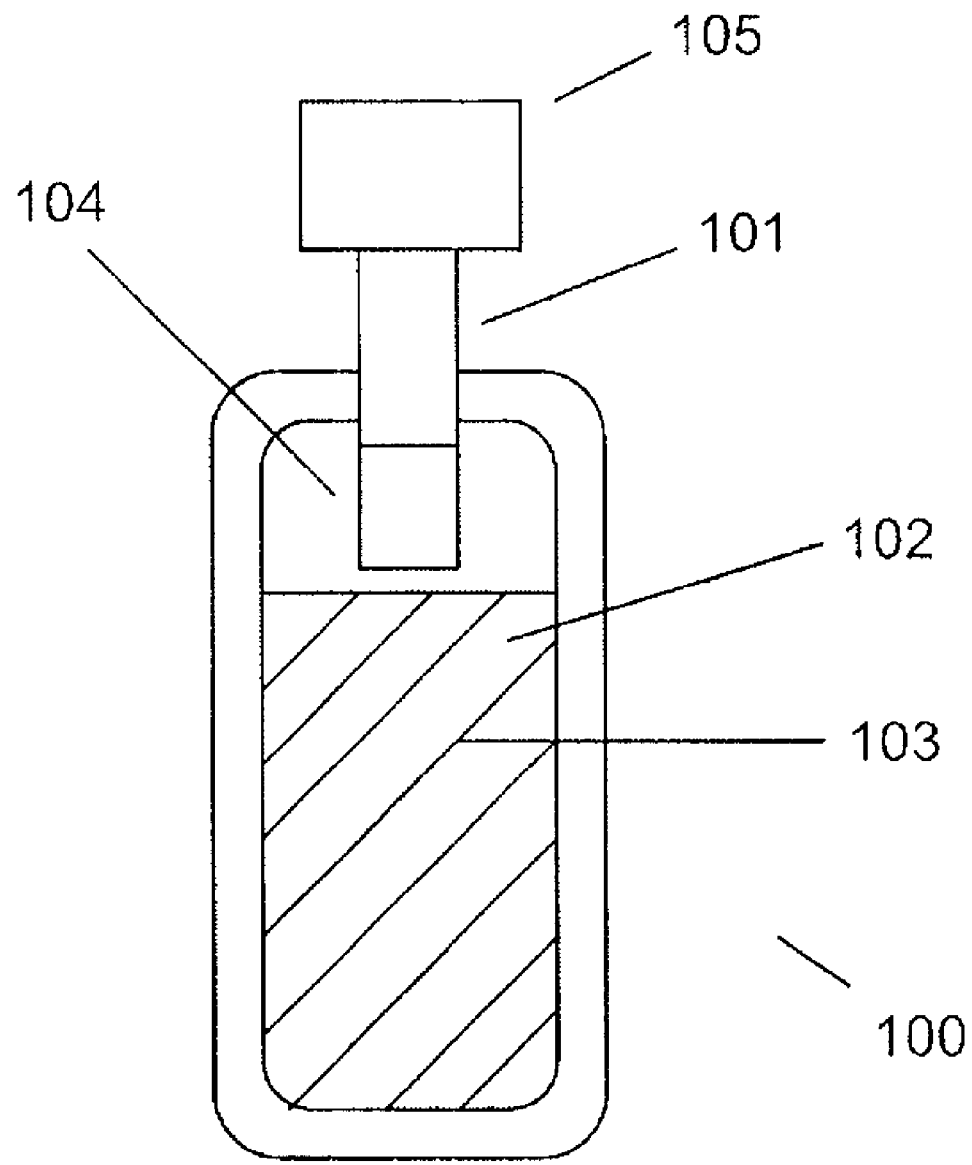
FIG. 1 illustrates a schematic representation of one embodiment according to the current invention.

Referring now to FIG. 1, embodiments of the method and apparatus according to the current invention are described hereafter. An acetylene storage device 100 is shown. The acetylene storage device 100 may be a conventional gas cylinder made of steel and suitable to store gases and of various sizes, as known to one of the art. Storage device 100 has an inlet/outlet 101, and an interior volume 102.

Disposed within the interior volume of 102 of storage device 100 may be pellets of a carbonaceous adsorbent 103 (e.g. activated carbon), which is suitable for reversibly adsorbing acetylene. The pellets of activated carbon may be also be in the form of small beads, and have specific properties such as average diameter of beads between 0.5 and 1 mm, bulk density between 0.5 and 1 g/cm$^3$, and specific surface areas between 1000 and 1500 m$^2$/g. These physical properties describe adsorbents with generally a small physical size, and a comparatively large amount of specific surface area. In one embodiment, the carbonaceous adsorbent 103 may be G-BAC, commercially available from the Kureha Corporation (Tokyo, Japan).

In some instances, the entire interior volume 102 may not be completely packed with carbonaceous adsorbent 103, such that there may be a headspace 104 in storage device 100. A pressure limiting device 105, such as a conventional regulator or valve, may also be provided such that pressure limiting device 105 would limit the pressure or flow rate of the acetylene entering or leaving the storage device 100, as would be understood by one of skill in the art. Limiting the pressure of the acetylene introduced or withdrawn (e.g. the pressure in the headspace 104) may have important safety concerns and can decrease the risk of explosive decomposition of the acetylene.

One of skill in the art would recognize that adsorption is a process that occurs when a gas or liquid solute accumulates on the surface of a solid or a liquid (adsorbent), forming a film of molecules or atoms. When acetylene is introduced into the interior volume 102 of the storage device it may be adsorbed by the carbonaceous adsorbent 103. The acetylene will remain stored/adsorbed by the adsorbent 103 until withdrawn (e.g. exposed to a lower pressure condition).

EXAMPLES

The following non-limiting examples are provided to further illustrate embodiments of the invention. However, the examples are not intended to be all inclusive and are not intended to limit the scope of the inventions described herein.

Example 1

Approximated 40 grams of carbonaceous adsorbent (G-BAC) was introduced into a sample vessel (150 ml) and a thermal pretreatment of the vessel and adsorbent (5 hours @ 200° C. under vacuum) was performed.

With a set filling flow rate of 20 sccm, a source $C_2H_2$ from the compressed gas cylinders (N40/N60; cylinder initial pressure 1.47 bar.g) was filled into the sample vessel while the pressure and the temperature at outer surface of sample vessel were monitored. Filling stopped when the vessel pressure reached a pre determined pressure. Final pressure in the vessel was around 650 torr @ R.T.

The amount of filled $C_2H_2$ was recorded by an MFC and calibrated with the $C_2H_2$ in the free space (head space of sample vessel, tubing . . . ) @ R.T.

Figure 2:
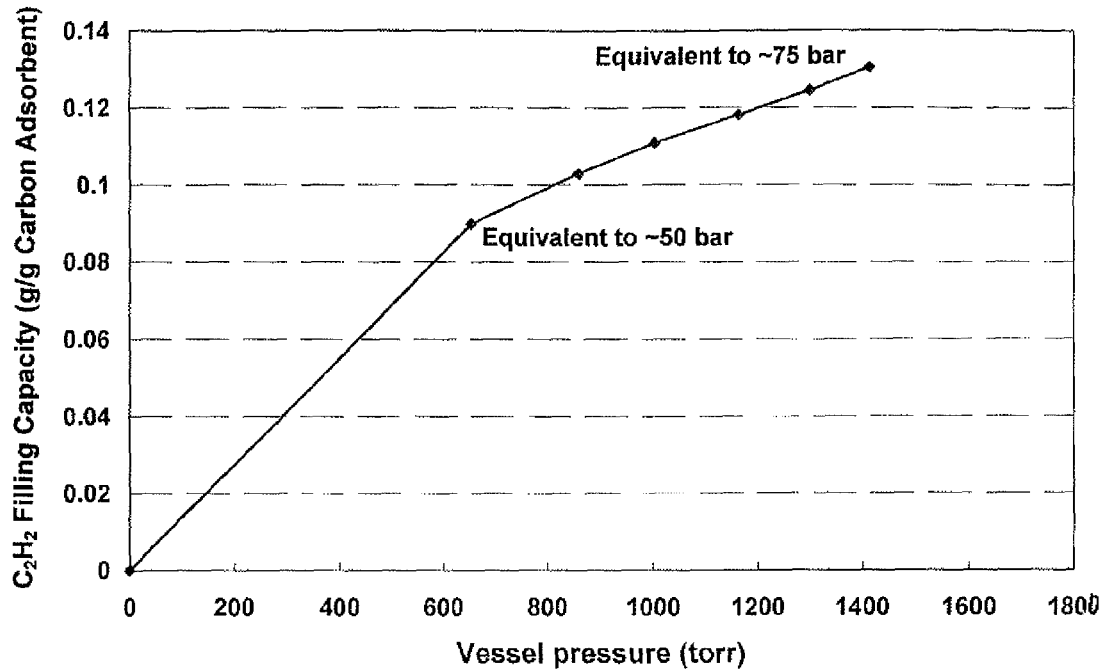
FIG. 2 illustrates experimental results, according to an embodiment of the current invention.

FIG. 2 shows graphically that $C_2H_2$ adsorption capacity is a function of final vessel pressure. Vessel pressure is the pressure at R.T.

FIG. 2 also compares the filing capacity to what would be achieved by a conventional cylinder without adsorbent. For instance, filling capacity was of the vessel at 630 torr(a) would be equivalent to what could be achieved by a 50 bar(a) cylinder. With the vessel pressure increased up to 1440 torr (a), filling capacity could only be increased up to the equivalent of a pressure about 75 bar(a).

Acetylene pressure equivalents are calculated by the gas law, (as high pressure acetylene cylinders are not available).

Comparing the filling capacity at vessel pressure of 630 torr(a) with conventional storages, carbon adsorbent system is 20 times (2000% higher) more than compressed $C_2H_2$ cylinder (2.47 bar(a)) and about 50% of the conventional solvent-type delivery system.

Example 2

The experimental set up of Example 1 was used. With a set delivering flow rate on the MFC, 25~200 sccm, adsorbed $C_2H_2$ was delivered from the sample vessel through MFC while the flow rate, vessel pressure and outer temperature were monitored. 4 bar(g) of $N_2$ was used as a vacuum generator for providing delivering driving force (~100 torr) and $C_2H_2$ diluting to the exhaust. Delivering was stopped when the flow rate was less than 5 sccm.

Figure 3:
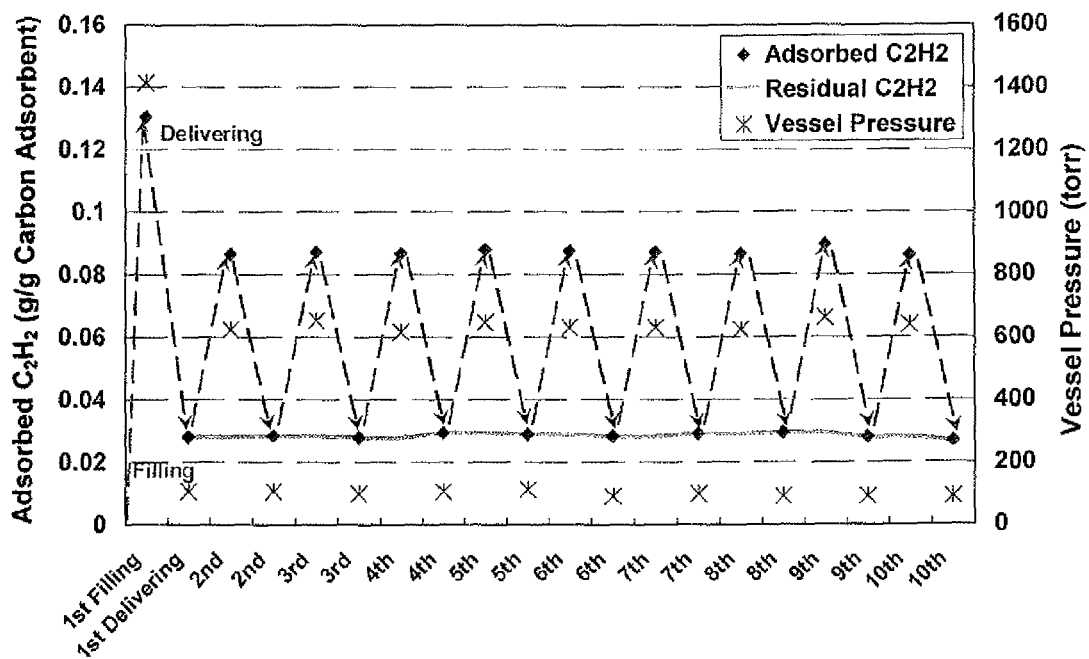
FIG. 3 illustrates a second set of experimental results, according to an embodiment of the current invention.
Figure 5:
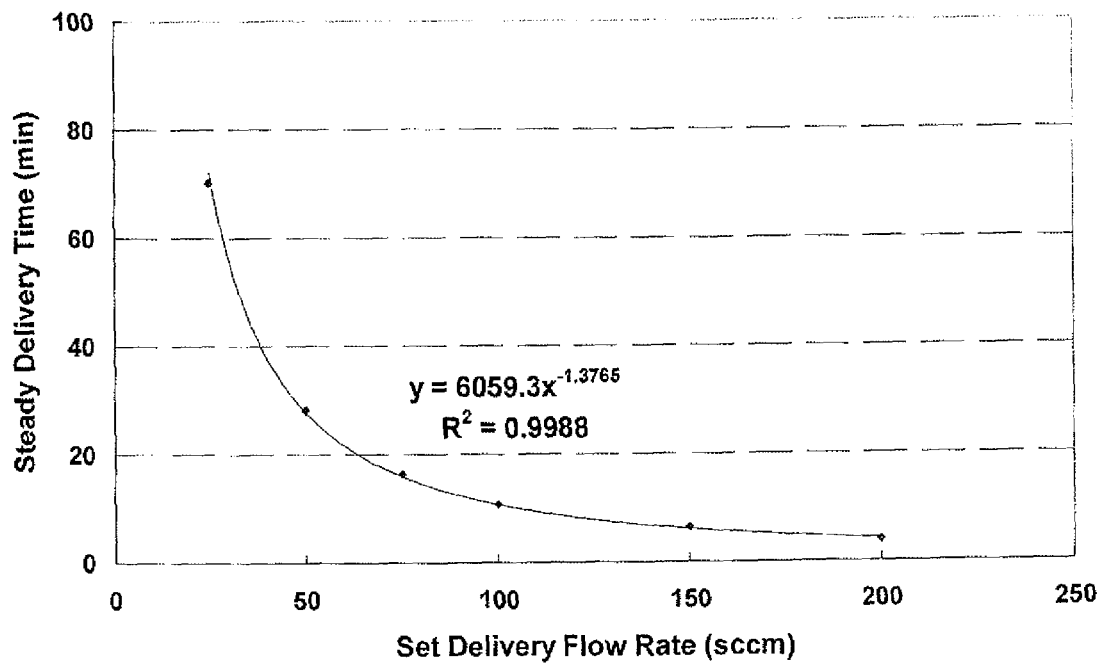
FIG. 5 illustrates a fourth set of experimental results, according to an embodiment of the current invention.

To show the recyclability or reusability of the carbon adsorbent system, 10 filling-delivering steps were carried out. The results are shown graphically in FIG. 3, and the raw data is presented in Table 1. The 1$^{st}$ filling was for verifying the relationship between vessel pressure and filling capacity, described in Example 1. The following 9 times filling-delivering tests successfully demonstrate that the carbon adsorbent is highly recyclable. The amount of residual $C_2H_2$ is a function of vacuum level downstream. With the vacuum generator at 4 bar(g) with $N_2$ flow, about 100 torr vacuuming was generated. With the same vacuum level downstream, residual $C_2H_2$ was kept the same and $C_2H_2$ was able to adsorb and desorb from carbon adsorbent reversibly.

generator, and it was possible to also characterize the stable delivery time as a function of set flow rate, shown in FIG. 5.

Example 4

Figure 6:
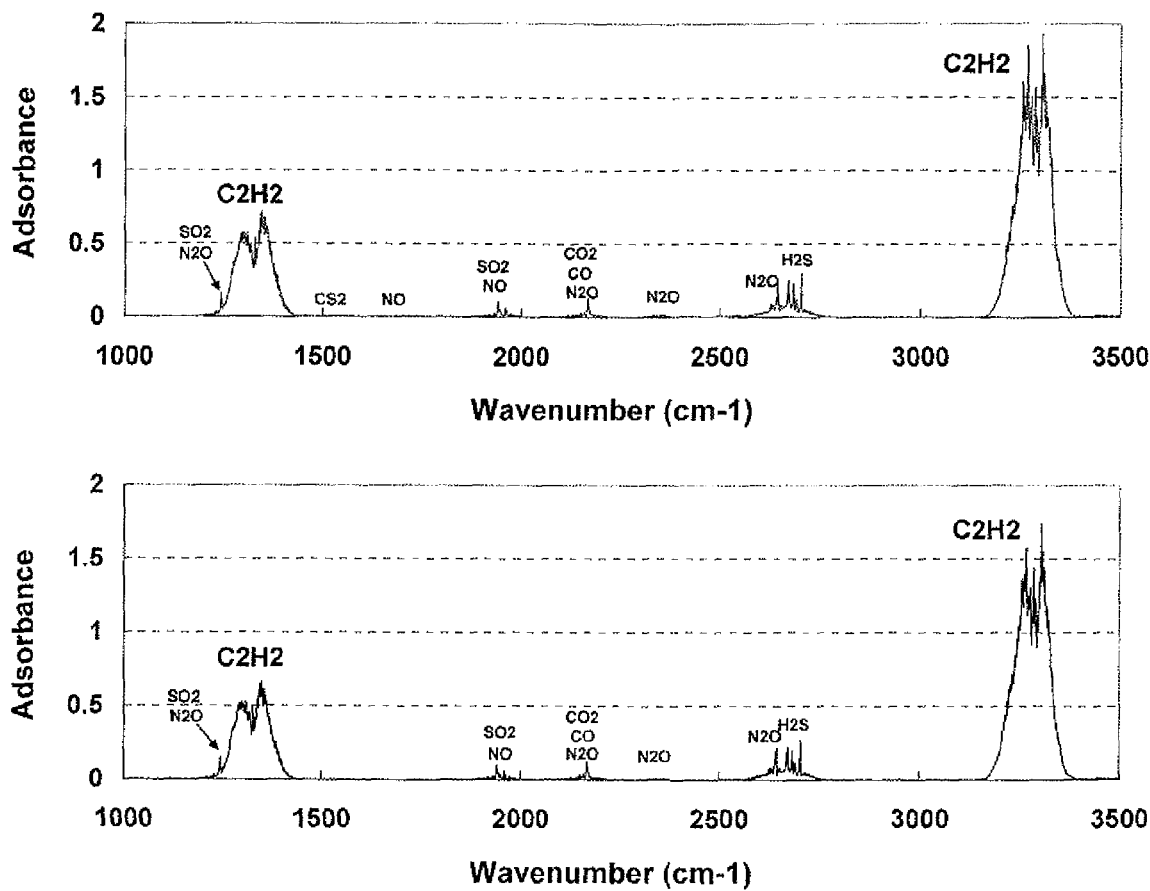
FIG. 6 illustrates a fifth set of experimental results, according to an embodiment of the current invention.

Analysis was done of the $C_2H_2$ withdrawn above according to the above examples. FIG. 6 shows FTIR spectrums, comparing the initial $C_2H_2$ source and the desorbed, withdrawn sample. The spectrums are almost identical, showing no appreciable negative effect from storage on purity.

Example 5

Based upon the results described above in examples 1-4, it was investigated if the system can support a higher delivery

TABLE 1

| | Test # | | | | | | | | | |
|---|---|---|---|---|---|---|---|---|---|---|
| | 1 | 2 | 3 | 4 | 5 | 6 | 7 | 8 | 9 | 10 |
| Filling time @ 20 sccm (min) | 228.12 | 102.38 | 103.03 | 102.97 | 102.66 | 102.25 | 103.00 | 100.33 | 105.17 | 102.00 |
| Vessel pressure after filling @ R.T. (torr) | 1413 | 623 | 654 | 616 | 646 | 631 | 631 | 623 | 661 | 638 |
| Filled $C_2H_2$ (g/g adsorbent) | 0.1304 | 0.0585 | 0.0588 | 0.0589 | 0.0586 | 0.0584 | 0.0589 | 0.0573 | 0.0601 | 0.0583 |
| Equivalent Filled pressure (bar · a) @ R.T. | 75.0 | 33.7 | 33.9 | 33.9 | 33.8 | 33.6 | 33.9 | 33.0 | 34.6 | 33.5 |
| Delivery set flow rate (sccm) | 50 | 50 | 50 | 50 | 50 | 25 | 75 | 100 | 150 | 200 |
| Stably Deliverable $C_2H_2$ (g/g adsorbent) | 0.0839 | 0.0413 | — | 0.0405 | 0.0422 | 0.0504 | 0.0352 | 0.0307 | 0.0274 | 0.0225 |
| Total Deliverable $C_2H_2$ (g/g adsorbent) | 0.1023 | 0.0582 | 0.0593 | 0.0575 | 0.0589 | 0.0593 | 0.0580 | 0.0571 | 0.0614 | 0.0595 |
| Vessel pressure after delivering @ R.T. (torr) | 106 | 106 | 99 | 106 | 114 | 91 | 99 | 91 | 91 | 91 |
| Residual $C_2H_2$ (g/g adsorbent) | 0.0280 | 0.0284 | 0.0279 | 0.0294 | 0.0291 | 0.0282 | 0.0292 | 0.0294 | 0.0281 | 0.0269 |

Example 3

The experimental set up of and results as described above were used.

Figure 4:
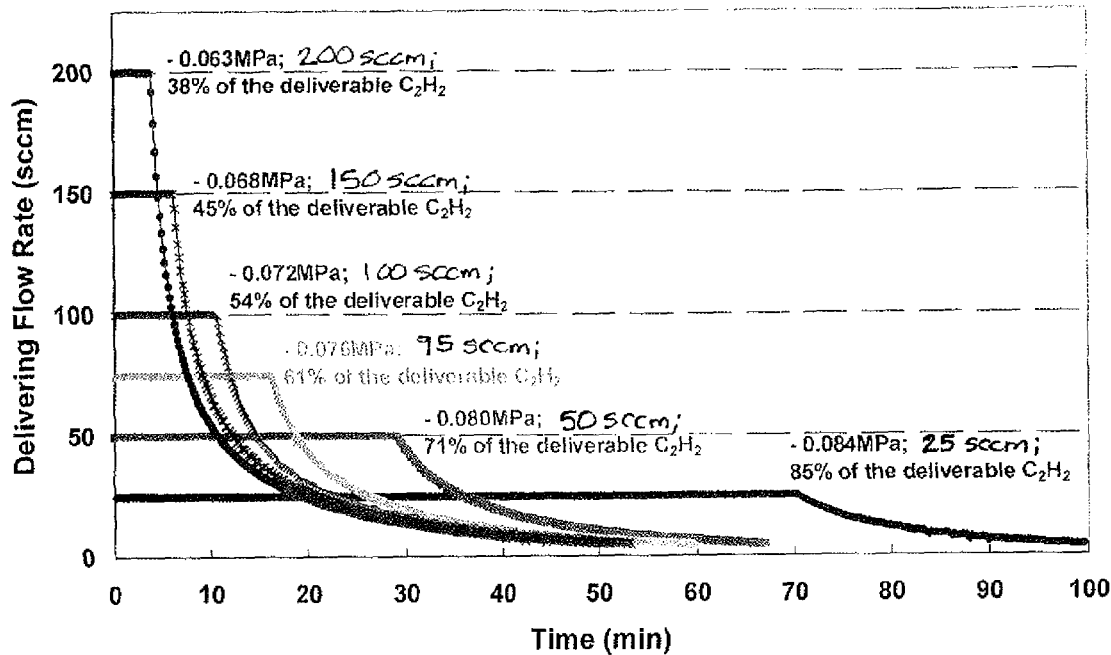
FIG. 4 illustrates a third set of experimental results, according to an embodiment of the current invention.
Figure 8:
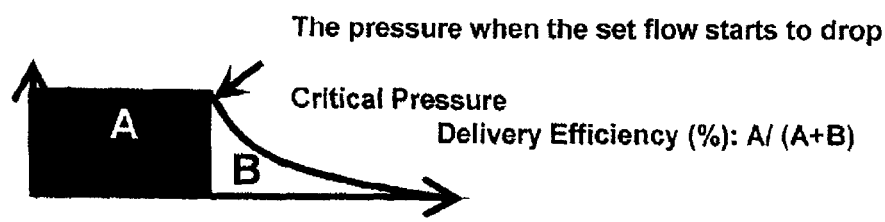
FIG. 8 is a graph illustrating delivery efficiency, defined as stable $C_2H_2$ delivery with set flow rate (area A) divided by total deliverable $C_2H_2$ (area A+B).

Delivery efficiency, defined as (stable $C_2H_2$ delivery with set flow rate A)/(total deliverable $C_2H_2$ A+B), varies with set flow rate, as shown graphically in FIGS. 4 and 8. The higher the set flow rate, the lower the delivery efficiency. The decreasing delivery efficiency with set flow rate is due to the decreased system temperature that occurs because the heat of adsorption is removed from the bed. The temperature decrease is similar in nature to the temperature decrease that occurs when vapor is removed from liquid ESG cylinders (e.g. DCS, WF6, BCl3, HCl, etc.).

Figure 7:
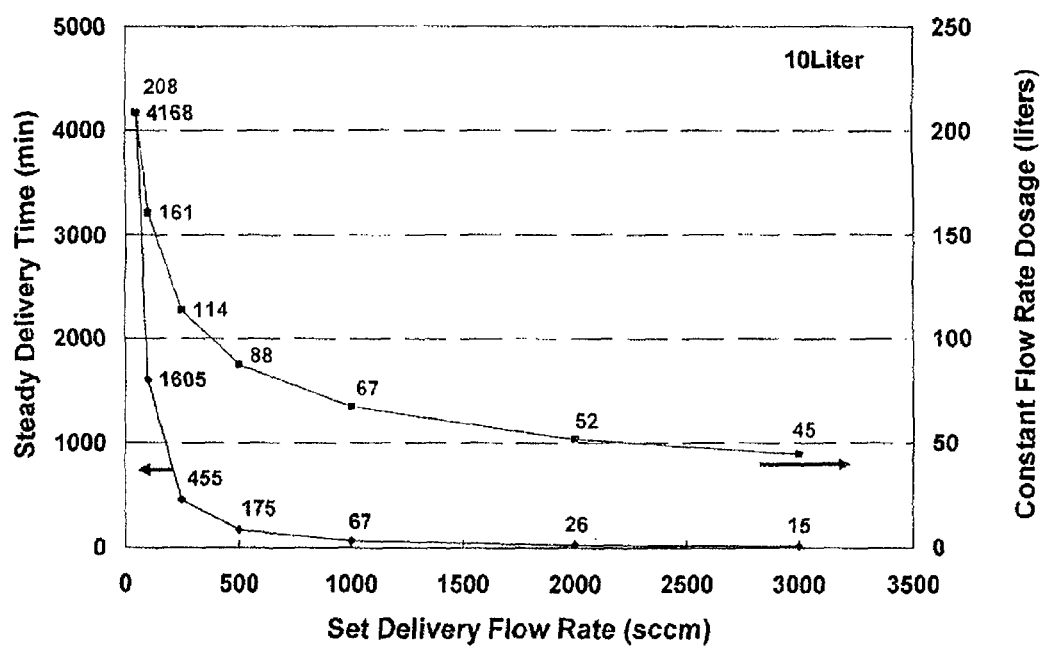
FIG. 7 illustrates a sixth set of experimental results, according to an embodiment of the current invention.

With the current experimental design, the downstream pressure was limited to 100 torr from the venture vacuum flow rate with a larger vessel size. Based on the results of 40 g sample shown in FIG. 5, the steady flow time at 1 slm for a similar 10 liter system with downstream pressure 100 torr were extrapolated and are shown graphically in FIG. 7.

Extrapolation:

$$y = 6059.3 x^{-1.3765} \left( 10{,}000 \div \left( \frac{40}{0.6} \right) \right), \text{ when } x = 1000 \text{ sccm}, y = 67.45 \text{ mins.}$$

While embodiments of this invention have been shown and described, modifications thereof can be made by one skilled in the art without departing from the spirit or teaching of this invention. The embodiments described herein are exemplary only and not limiting. Many variations and modifications of the composition and method are possible and within the scope of the invention. Accordingly the scope of protection is not limited to the embodiments described herein, but is only limited by the claims which follow, the scope of which shall include all equivalents of the subject matter of the claims.

What is claimed is:

1. A method of storing acetylene, comprising:
   a) providing an acetylene storage device wherein the storage device comprises an interior volume;
   b) disposing a carbonaceous adsorbent in the interior volume of the storage device;
   c) pre-treating the carbonaceous adsorbent in the storage device by heating to a temperature of about 200° C.;
   d) introducing acetylene into the interior volume of the storage device;
   e) reversibly adsorbing at least part of the acetylene introduced into the interior volume of the storage device with the carbonaceous adsorbent;
   wherein the final pressure in the storage device is a pressure less than about 2 bar.

2. The method of claim 1, wherein the final pressure in the storage device is less than atmospheric pressure.

3. The method of claim 1, further comprising desorbing at least part of the adsorbed acetylene, and withdrawing the desorbed acetylene from the acetylene storage device.

4. The method of claim 3, further comprising withdrawing the desorbed acetylene from the acetylene storage device at a rate of less than about 5 slm.

5. The method of claim 3, further comprising withdrawing the desorbed acetylene from the acetylene storage device at a pressure less than about 2 bar.

6. The method of claim 3, wherein the withdrawn acetylene has a purity substantially the same as that of the initially introduced acetylene.

7. A method of storing acetylene, comprising:
   a) providing an acetylene storage device wherein the storage device comprises an interior volume;
   b) disposing a carbonaceous adsorbent in the interior volume of the storage device;
   c) pre-treating the acetylene storage device and the carbonaceous adsorbent prior to the introduction of the acetylene by heating to a temperature of about 200° C.;
   d) introducing acetylene into the interior volume of the storage device;
   e) reversibly adsorbing at least part of the acetylene introduced into the interior volume of the storage device with the carbonaceous adsorbent; and
   f) maintaining the pressure in the storage device at a pressure less than about 2 bar.

8. The method of claim 1, wherein the carbonaceous adsorbent comprises carbon beads.

9. The method of claim 8, wherein the carbonaceous adsorbent comprises these characteristics:
   a) an average diameter of beads less than about 0.7 mm;
   b) a bulk density of about 0.6 g/cm$^3$; and
   c) a specific surface area between about 1,100 and about 1,300 m$^2$/g.

10. The method of claim 7, wherein the carbonaceous adsorbent comprises carbon beads.

11. The method of claim 7, wherein the carbonaceous adsorbent comprises these characteristics:
    a) an average diameter of beads less than about 0.7 mm;
    b) a bulk density of about 0.6 g/cm$^3$; and
    c) a specific surface area between about 1,100 and about 1,300 m$^2$/g.

12. The method of claim 7, wherein the final pressure in the storage device is less than atmospheric pressure.

13. The method of claim 7, further comprising desorbing at least part of the adsorbed acetylene, and withdrawing the desorbed acetylene from the acetylene storage device.

14. The method of claim 13, further comprising withdrawing the desorbed acetylene from the acetylene storage device at a rate of less than about 5 slm.

15. The method of claim 13, further comprising withdrawing the desorbed acetylene from the acetylene storage device at a pressure less than about 2 bar.

16. The method of claim 13, wherein the withdrawn acetylene has a purity substantially the same as that of the initially introduced acetylene.

* * * * *